United States Patent
Hanel

(10) Patent No.: US 7,676,303 B2
(45) Date of Patent: Mar. 9, 2010

(54) SYSTEM AND METHOD FOR CONVERTING AN AIRCRAFT FROM A FLIGHT CONDITION LYING OUTSIDE A PERMISSIBLE FLIGHT CONDITION RANGE TO A FLIGHT CONDITION LYING WITHIN THE PERMISSIBLE FLIGHT CONDITION RANGE

(75) Inventor: Martin Hanel, Putzbrunn (DE)

(73) Assignee: EADS Deutschland GmbH, Ottobrunn (DE)

( * ) Notice: Subject to any disclaimer, the term of this patent is extended or adjusted under 35 U.S.C. 154(b) by 854 days.

(21) Appl. No.: 11/485,313

(22) Filed: Jul. 13, 2006

(65) Prior Publication Data

US 2007/0016343 A1  Jan. 18, 2007

(30) Foreign Application Priority Data

Jul. 14, 2005  (DE) ..................... 10 2005 032 849

(51) Int. Cl.
   *G01C 23/00*  (2006.01)
(52) U.S. Cl. ............................................. 701/3; 701/2
(58) Field of Classification Search .............. 701/2, 701/3, 301
   See application file for complete search history.

(56) References Cited

U.S. PATENT DOCUMENTS 6,163,744 A * 12/2000 Onken et al. ................... 701/3
6,236,914 B1   5/2001 Kaloust
6,246,929 B1   6/2001 Kaloust
7,098,810 B2 * 8/2006 Bateman et al. ............. 340/963
2004/0044444 A1 * 3/2004 Johnson et al. ................ 701/3

FOREIGN PATENT DOCUMENTS

DE   600 06 120 T2   8/2004
WO   WO-00/77586 A2  12/2000

OTHER PUBLICATIONS

Brockhaus, Rudolf, "Flugregelung" ("Flight Control"), Springer Publishing House, Berlin/Heidelberg, Germany, 1994, pp. 722-725.

* cited by examiner

*Primary Examiner*—Mark Hellner
*Assistant Examiner*—Helal A Algahaim
(74) *Attorney, Agent, or Firm*—Greenblum & Bernstein P.L.C.

(57) ABSTRACT

A system and method for converting an aircraft from a flight condition lying outside a permissible flight condition range to a flight condition lying within the permissible flight condition range, that can be assigned to a sensor system and a control device of the aircraft. The system includes a control override module for taking over or returning the control authority over the aircraft based on a control take-over signal and for feeding control set points if the control takeover signal is set; a maneuver selection module; a threshold value generator for calculating the flight range limit on the basis of measured variables of the sensor system; a decision module; a command generator that is functionally connected on the one hand to the decision module and the maneuver selection module and on the other hand to the control override module and, when the control takeover signal is set, calculates the control set points based on the maneuver information and transmits them to the control override module.

8 Claims, 2 Drawing Sheets

SYSTEM AND METHOD FOR CONVERTING AN AIRCRAFT FROM A FLIGHT CONDITION LYING OUTSIDE A PERMISSIBLE FLIGHT CONDITION RANGE TO A FLIGHT CONDITION LYING WITHIN THE PERMISSIBLE FLIGHT CONDITION RANGE

CROSS-REFERENCE TO RELATED APPLICATION

This application claims priority under 35 U.S.C. §119 of German Patent Application No. 10 2005 032 849.0-32, filed on Jul. 14, 2005, the disclosure of which is hereby incorporated by reference herein in its entirety.

BACKGROUND OF THE INVENTION

1. Field of the Invention

The invention relates to a system and a method for converting an aircraft from a flight condition lying outside a permissible flight condition range to a flight condition lying with the permissible flight condition range.

2. Discussion of Background Information

With conventional aircraft, reliable maneuvering in the range outside the flight range limits is solely the responsibility of the pilot. Depending on the type of aircraft and frequency of deployment, different aircraft loss rates are known because limits are exceeded (e.g., due to speed being too low).

With most fixed-wing and variable-wing aircraft, the forces for stabilizing and controlling flight attitude and flight path are generated by air flow on movable control surfaces, such as elevators, the rudder and ailerons. If, in addition, the inherent dynamics of aircraft are unstable, control forces are required to stabilize the aircraft movement in every flight attitude. If the airspeed falls below a technically preset minimum typical for the aircraft, the forces forming on the control surfaces of the aircraft will become too small to maintain control of the aircraft position and the flight path in a stable manner. The risk of an aircraft crash arises, e.g., through a tailspin, from which the pilot cannot, in many cases, pull up.

To support the pilot, systems are known that produce an acoustic signal to alert the pilot to the impending danger of exceeding a flight range limit (e.g., by reaching a minimum speed). The pilot must then start a pull-up maneuver immediately and perform it manually.

From the document WO 00/77586 A2, an autopilot control device is known for controlling the movement of an aircraft in a fluid medium in any one of a pre-stall region, a stall region, and a post-stall region. Control devices are provided that convert the aircraft from a flight condition lying outside a permissible flight condition range to a flight condition lying within the permissible flight condition range.

Furthermore, auto pilot systems are generally known which can be switched on by the pilot in order to take over certain control or regulating functions, e.g., the altitudes or speed control.

SUMMARY OF THE INVENTION

The invention perceptibly reduces, or completely avoids, the danger of aircraft crashes due to exceeding a flight range limit typical for aircraft.

A flight guidance system is installed in the aircraft, which system monitors the flight range limits, takes over the control of the aircraft if the flight range limits are exceeded, performs a flight maneuver and, thus, returns the aircraft to within the permissible flight range.

The aircraft should be able to move without restrictions up to the limit of the permissible flight condition range. If the limit is exceeded, a pull-up maneuver is performed that restores the aircraft to the permissible flight condition range. It should be noted thereby that the aircraft can lose speed considerably even during the most favorable pull-up maneuver. The pull-up maneuver must therefore be started significantly above the minimum airspeed typical for the aircraft. The limiting speed of the permissible flight condition range thus does not result as a fixed number, but must be continuously calculated depending on the current flight condition.

Because the pilot should concentrate on his/her opponent in air combat, an automatic selection and performance of the pull-up maneuver is recommended.

A special exemplary embodiment of the invention is a slow-flight pull-up system. This system makes it possible to perceptibly reduce or completely avoid the danger of aircraft crashes due to falling below the minimum flight speed typical for the aircraft.

A flight guidance system for returning an aircraft from a flight condition lying outside a permissible flight condition range to a flight condition lying within the flight condition range is provided that can be assigned to a sensor system and a control device of the aircraft, the flight guidance system including:

A control override module (A) for taking over or returning the control authority over the aircraft based on a control take-over signal (a) and for feeding control set points (c) if the control takeover signal (a) is set;

A maneuver selection module (M) for providing and storing at least one conversion strategy with associated maneuver information (i) and for selecting a conversion strategy depending on measured variables (b) of the sensor system (S);

A threshold value generator (G) for calculating the flight range limit (g) on the basis of measured variables (b) of the sensor system (S);

A decision module (E) that is functionally connected to the threshold value generator (G) and the sensor system (S) and receives from the former the calculated flight range limit (g) and from the latter the measured variables (b), and that generates a control takeover signal (a) based on a comparison of the flight range limit (g) with the measured variables (b) and transmits it to the control override module (A), the command generator (K) and the maneuver selection module (M);

A command generator (K) that is functionally connected on the one hand to the decision module (E) and the maneuver selection module (M) and on the other hand to the control override module (A) and, when the control takeover signal (a) is set, calculates the control set points (c) based on the maneuver information (i) and transmits them to the control override module (A).

The command generator can additionally be functionally connected to the sensor system and include a position control unit that calculates the control set points with the aid of measured variables of the sensor system such that the aircraft maintains a flight attitude preset through the maneuver information.

The threshold value generator can additionally comprise functions with which a strategy change limit can be calculated and supplied to the decision module, whereby the decision module additionally is functionally connected to the maneuver selection module and transmits thereto a strategy change signal based on the comparison of the strategy change limit with measured variables of the sensor system, whereby the stored conversion strategy is replaced by a different one and the maneuver information is adjusted.

Furthermore, a method for converting an aircraft from a flight condition lying outside a preset flight condition range into a flight condition lying within the flight condition range based on measured variables of a sensor system is provided, which includes the following:

Selecting and storing a conversion strategy of at least one alternative based on the measured variables of the sensor system;

Calculating the flight condition range limit from the measured variables of the sensor system;

Comparing the measurement data of the sensor system with the flight condition range limit in order to activate the control override module, taking over the aircraft control and performing the maneuver established by the conversion strategy, if this limit is exceeded;

Generating a control set point in the command generator and feeding it into the aircraft control such that the aircraft implements the selected conversion strategy, Comparing the measurement data with the flight condition range limit in order to deactivate the control override module and to hand over the aircraft control if it falls below this limit.

The flight condition range limit can thereby be represented by a limiting speed that is calculated depending on the measured variables delay, pitch position angle, roll position angle, angle of attack, angle of yaw, height above mean sea level and aircraft mass.

The control set point of the command generator can comprise an angle of attack set point, an angle of yaw set point, and/or a roll position regulation.

In an additional feature, the conversion strategy once selected and stored can be replaced as a reaction to external disturbances by a then more favorable conversion strategy with:

A calculation of the strategy change threshold value;

A comparison of the strategy change threshold value with measured variables of the sensor system in order to generate the strategy change signal when the strategy change threshold value is exceeded; and The replacement of the stored conversion strategy by a different one with the simultaneous adjustment of the maneuver information.

Other exemplary embodiments and advantages of the invention can be ascertained by reviewing this disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the invention, in which like reference numerals represent similar parts throughout the several views of the drawings, and wherein.

DETAILED DESCRIPTION OF THE INVENTION

Figure 1:
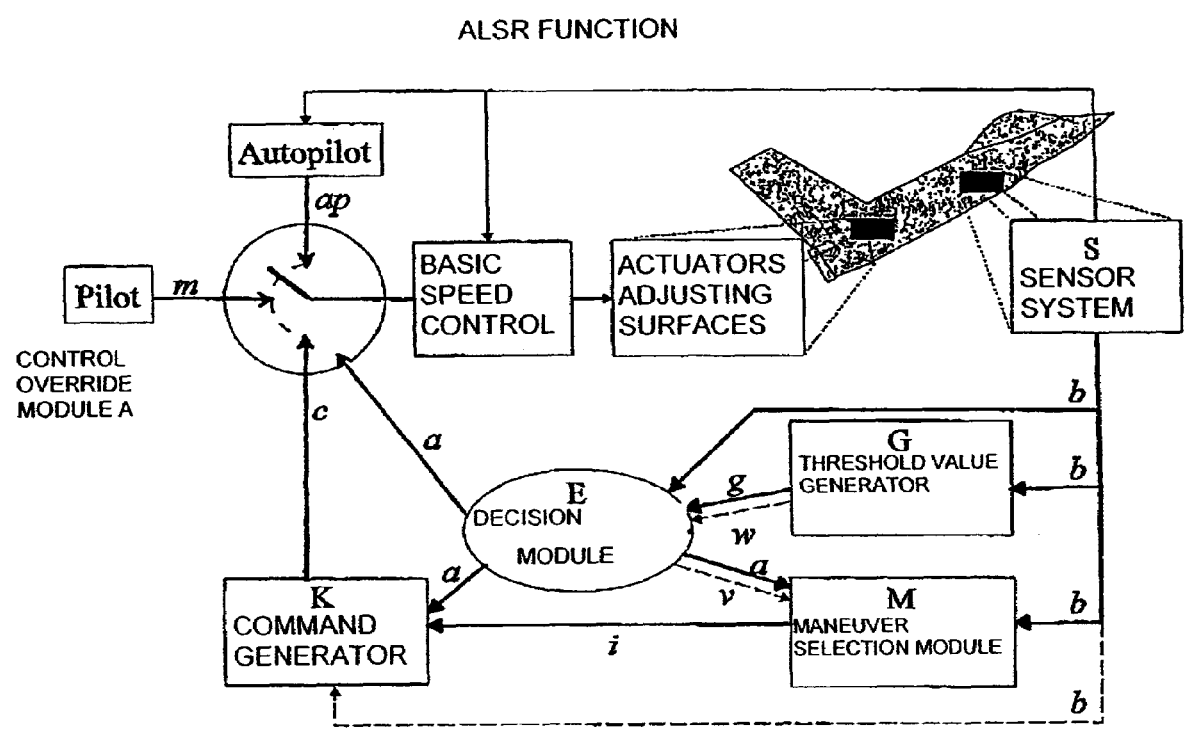
FIG. 1 is a schematic representation of an exemplary system according to the invention.
Figure 2:
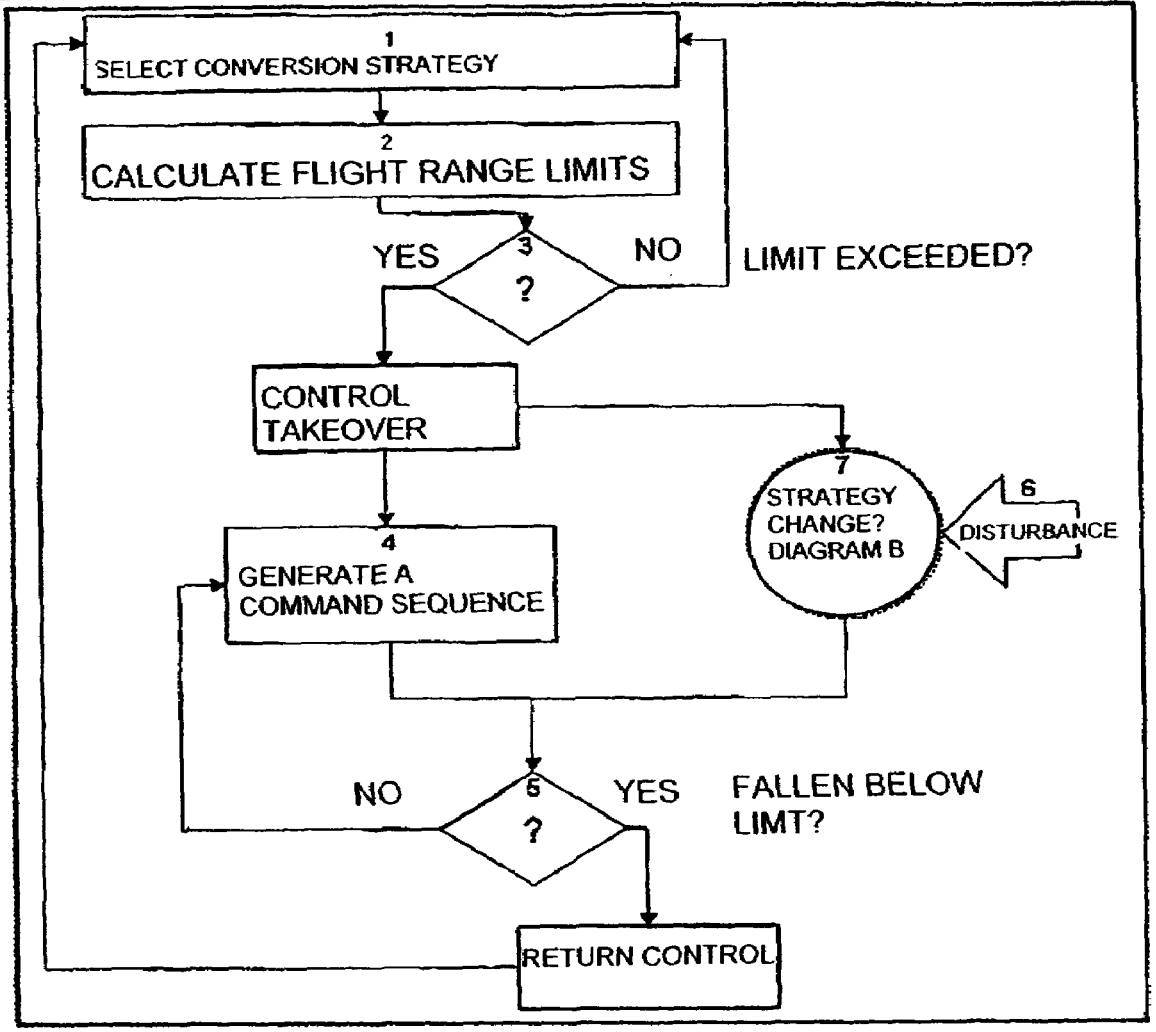
FIG. 2 is a schematic representation of an exemplary method according to the invention.
Figure 2:
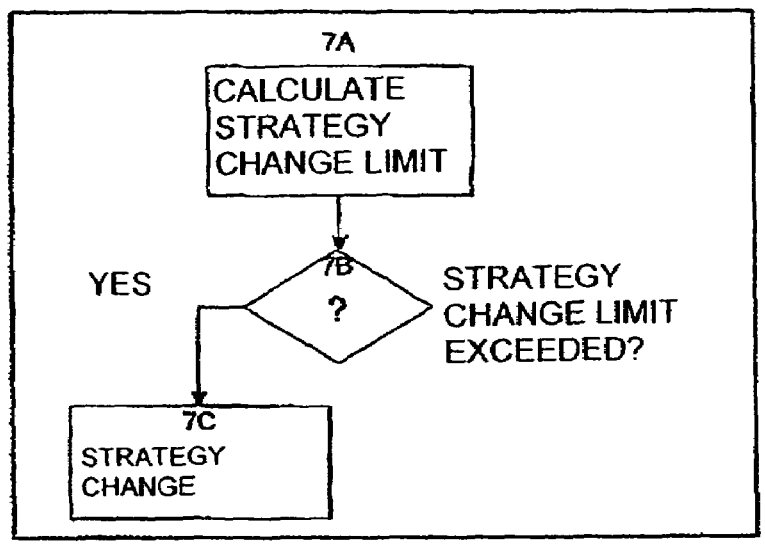

The particulars disclosed herein are by way of example and for purposes of providing an illustrative discussion of embodiments of the invention only and are presented in the cause of providing what is believed to be a useful and readily understood description of the principles and conceptual aspects of the invention. In this regard, details of the invention that are presented herein is intended to provide a fundamental understanding of the invention, the description taken with the drawings making apparent to those skilled in the art how the several forms of the present invention may be embodied in practice.

The system according to the invention includes the modules next described.

The control override module (A) serves to take over or return the control authority over the aircraft based on a control takeover signal (a) and to feed in control set points (c) when the control takeover signal (a) is set. The control override module (A) takes over control of the aircraft from the pilot or an autopilot system upon activation (control takeover signal (a) set), and upon deactivation (control takeover signal (a) not set) returns the aircraft control to the pilot. If the control takeover signal is set, the control override module replaces the control signals of the pilot or autopilot by the control set points (c) of the system.

A maneuver selection module (M) serves to provide and store at least one conversion strategy with associated maneuver information (i) and to select a conversion strategy depending on measured variables (b) of the sensor system (S). The maneuver selection module (M) continuously provides at least one conversion strategy, in the case of several alternatives selects the most favorable conversion strategy from (1) based on the measured variables of the current flight condition and stores it as soon as the control takeover signal (a) is set. In the case of a particular exemplary embodiment, the conversion strategy is composed of a basic maneuver type (pull out, nose down, or flight along angle of sideslip), and an initial or final maneuver sequence. The basic maneuver type is thereby selected based on the measured values of the current flight wind tilt angle and roll position angle. Maneuver information (i), e.g., prescribed variables for position and path variables, are generated for the selected and stored conversion strategy and supplied to the command generator (K). For some flight conditions (combinations of flight wind tilt angle and roll position angle) only one maneuver base (T) is possible; for others, however, several basic types are possible. The assessment of the maneuver types generally takes place according to the criterion of the quickest possible return of the aircraft to the permissible flight range. If a disturbance (6) occurs after the control takeover, e.g., strong wind gusts or an engine failure, the system can perform a reassessment of the takeover strategies and perform a change of strategy (7). In this case, the maneuver selection module (M) receives the strategy change signal (v) from the decision module (E). The maneuver selection module (M) then replaces (7C) the stored conversion strategy with a more favorable one and adjusts the maneuver information (i).

The threshold value generator (G) calculates (2) the flight range limit (g) from the measured variables of the sensor system (S). In the embodiment of the system according to a particular embodiment, the flight range limit (g) is represented by a limiting speed. In a particular exemplary embodiment, the measured variables flight wind tilt angle, roll position angle, roll rate, pitch position angle, angle of attack, angle of yaw, delay, height above mean sea level and aircraft mass are incorporated into the calculation of the limiting speed. Larger flight tilt angles, greater aircraft mass and greater delay, for example, lead to a higher limiting speed. Pilot inputs, e.g., thrust uprating, are recorded via their impact on the measured variables, e.g., the delay. In the embodiment of the system according to other particular embodiments, a strategy change limit (w) is additionally calculated in the threshold value generator (G). In a special exemplary embodiment, the strategy change limit concerns that speed at which, if fallen below, the flight along the angle of sideslip conversion strategy must be selected. At speeds close to zero, the greatest possibility of survival results in flight along the angle of sideslip.

The decision on control takeover takes place in the decision module (E), which is connected to the sensor system and the threshold value generator (G). To that end the flight range limit (g) is compared with measured variables (b) of the sensor system (S). If the flight range limit (g) is exceeded, the control takeover signal (a) is set. The comparison (3, 5) is also further continued after the control takeover. If the permissible flight range is reached again, i.e., if it falls below (5) the flight range limit again, the control takeover signal (a) is deactivated (not set). In the embodiment of the system according the aforementioned particular embodiment, the strategy change limit (w) is additionally compared to measured variables (b) of the sensor system (S). In a particular exemplary embodiment the current speed is compared to the limiting speed. If a limit exceedance is detected (i.e., if the current speed is lower than the limiting speed), the control takeover signal (a) is set and transmitted to the control override module (A) and the command generator (K). It is determined through a comparison (7B) of the current speed with the strategy change limit whether a strategy change is necessary. If the current speed falls below the strategy change limit (w), the strategy change signal (v) is generated and transmitted to the maneuver selection module (M).

The command generator (K) is functionally connected to a decision module (E), the maneuver selection module (M) and the control override module (A).

The decision module (E), which is functionally connected to the threshold value generator (G) and the sensor system (S), receives the calculated flight range limit (g) from the threshold value generator (G) and the measured variables (b) from the sensor system and generates on the basis of a comparison of the flight range limit (g) with the measured variables (b) a control takeover signal (a) that can transmit it to the control override module (A), the command generator (K) and the maneuver selection module (M).

The command generator (K) receives the control takeover signal (a) from the decision module and the maneuver information (i) from the maneuver selection module. If the control takeover signal (a) is set, the command generator (K) calculates (4) on the basis of the maneuver information (i) the control set points (c) for the selected conversion strategy and supplies them to the control override module (A). In another particular embodiment, the command generator is additionally functionally connected to the sensor system (S) and comprises an angle of attack set point, an angle of yaw set point and a roll position regulating unit. In this case, the maneuver information (i) contains data on the desired roll position angle and the measured actual roll position angle is supplied to the command generator (K) by the sensor system (S). For flight along the angle of sideslip, for example, a desired roll position angle of 90° is generated. From the actual and desired roll position angles, the command generator (K) calculates a roll rate set point. Angle of attack, angle of yaw and rolling rate set point are converted into control set points (c) for foot pedal and control stick and transmitted together with a control set point (c) for the thrust lever to the control override module (A).

The method according to the invention serves to convert an aircraft from a flight condition lying outside a preset flight condition range into a flight condition lying inside the flight condition range based on measured variables of a sensor system and includes the following:

Selecting (1) and storing a conversion strategy of at least one alternative based on the measured variables (b) of the sensor system (S);

Calculating (2) the flight condition range limit (g) from the measured variables (b) of the sensor system (S);

Comparing (3) the measured data (b) of the sensor system (S) with the flight condition range limit (g) in order, if this limit is exceeded, to activate the control override module (A), to take over the control of the aircraft and to perform the maneuver identified by the takeover strategy;

Generating (4) a control set point (c) in the command generator (K) and storing in the aircraft control such that the aircraft implements the selected conversion strategy;

Comparing (5) the measured data (b) of the sensor system (S) with the flight condition range limit (g) in order, if it falls below this limit, to deactivate the control override module (A) and to hand over the aircraft control.

As the flight condition range limit (g) a limiting speed can be used that is calculated as a function of the measured variables delay, pitch position angle, roll position angle, angle of attack, angle of yaw, height above mean sea level and aircraft mass.

The control set point (c) of the command generator (K) can comprise an angle of attack set point, an angle of yaw set point and/or a roll position regulation.

The conversion strategy once selected and saved can be replaced as a reaction to external disturbances (6) by a then more favorable conversion strategy, whereby the following are carried out:

Calculating (7A) the strategy change threshold value (w);

Comparing (7B) the strategy change threshold value (w) with measured variables of the sensor system (b), in order to generate the strategy change signal (v) if the strategy change threshold value is exceeded; and Replacing (7C) the stored conversion strategy by another with the simultaneous adjustment of the maneuver information (i).

The foregoing examples have been provided merely for the purpose of explanation and are in no way to be construed as limiting of the present invention. While the present invention has been described with reference to exemplary embodiments, it is to be understood that the words which have been used herein are words of description and illustration, rather than words of limitation. Changes may be made, within the purview of the appended claims, as presently stated and as amended, without departing from the scope and spirit of the present invention in its aspects. Although the invention has been described herein with reference to particular means, materials, and embodiments, the invention is not intended to be limited to the particulars disclosed herein; rather, the invention extends to all functionally equivalent structures, methods and uses, such as are within the scope of the appended claims.

The invention claimed is:

1. A system configured to convert an aircraft from a flight condition lying outside a permissible flight condition range to a flight condition lying within the permissible flight condition range, that is assigned to a sensor system and a control device of the aircraft, comprising:

a control override module configured to take over or returning the control authority over the aircraft based on a control take-over signal and for feeding control set points if the control takeover signal is set;

a maneuver selection module configured to provide and storing at least one conversion strategy with associated maneuver information and for selecting a conversion strategy depending on measured variables of the sensor system;

a threshold value generator configured to calculate the flight range limit on the basis of measured variables of the sensor system;

a decision module functionally connected to the threshold value generator and the sensor system and to receive from the value generator the calculated flight range limit and from the sensor system the measured variables, and to generate a control takeover signal based on a comparison of the flight range limit with the measured variables and to transmit it to the control override module, the command generator and the maneuver selection module;

a command generator functionally connected, on the one hand, to the decision module and the maneuver selection module and, on the other hand, to the control override module and, when the control takeover signal is set, calculates the control set points based on the maneuver information and transmits them to the control override module.

2. A flight guidance system according to claim 1, wherein:
the command generator is additionally functionally connected to the sensor system;
the command generator comprises a position control unit that calculates the control set points with the aid of measured variables of the sensor system such that the aircraft maintains a flight attitude preset through the maneuver information.

3. A flight guidance system according to claim 1, wherein:
the threshold value generator additionally comprises functions with which a strategy change limit can be calculated and supplied to the decision module;
the decision module additionally is functionally connected to the maneuver selection module and transmits thereto a strategy change signal based on the comparison of the strategy change limit with measured variables of the sensor system, whereby the stored conversion strategy is replaced by a different one and the maneuver information is adjusted.

4. A method for converting an aircraft from a flight condition lying outside a preset flight condition range to a flight condition lying within the flight condition range, on the basis of measured variables of a sensor system, said method comprising:

selecting and storing a conversion strategy of at least one alternative based on the measured variables of the sensor system, whereby the conversion once selected and stored is replaced as a reaction to external disturbances by a then more favorable conversion strategy;

calculating a strategy change threshold value, comparing the strategy change threshold value with measured variables of the sensor system in order to generate the strategy change signal when the strategy change threshold value is exceeded, and replacing the stored conversion strategy by a different one with the simultaneous adjustment of the maneuver information;

calculating a flight condition range limit from the measured variables of the sensor system;

comparing the measurement data of the sensor system with the flight condition range limit in order to activate the control override module, take over the aircraft control and perform the maneuver established by the conversion strategy, if said limit is exceeded;

generating a control set point in the command generator and feeding said control set point into the aircraft control such that the aircraft implements the selected conversion strategy;

comparing the measurement data of the sensor system with the flight condition range limit in order to deactivate the control override module and to hand over the aircraft control if it falls below said limit.

5. A method according to claim 4, wherein:
the flight condition range limit is represented by a limiting speed that is calculated as a function of the measured variables delay, pitch position angle, roll position angle, angle of attack, angle of yaw, height above mean sea level and aircraft mass.

6. A method according to claim 4, wherein:
the control set point of the command generator comprises an angle of attack set point, an angle of yaw set point and/or a roll position regulation.

7. A flight guidance system according to claim 1, wherein:
said control override module for taking over or returning the control authority over the aircraft based on a control take-over signal and for feeding control set points if the control takeover signal is set comprises:
a control override module for taking over control authority over the aircraft based on a control take-over signal indicative of unstable aircraft dynamics.

8. A method according to claim 4, wherein:
said calculating a flight condition range limit comprises calculating a flight condition range limit as indicative of a limit of stable aircraft dynamics.

* * * * *